United States Patent
Bunker

(10) Patent No.: US 8,753,071 B2
(45) Date of Patent: Jun. 17, 2014

(54) COOLING CHANNEL SYSTEMS FOR HIGH-TEMPERATURE COMPONENTS COVERED BY COATINGS, AND RELATED PROCESSES

(75) Inventor: Ronald Scott Bunker, Waterford, NY (US)

(73) Assignee: General Electric Company, Niskayuna, NY (US)

(*) Notice: Subject to any disclaimer, the term of this patent is extended or adjusted under 35 U.S.C. 154(b) by 579 days.

(21) Appl. No.: 12/975,609

(22) Filed: Dec. 22, 2010

(65) Prior Publication Data
US 2012/0163984 A1   Jun. 28, 2012

(51) Int. Cl.
*F01D 5/08*  (2006.01)

(52) U.S. Cl.
USPC .......................................... 415/115; 416/97 R

(58) Field of Classification Search
USPC ..................... 415/115; 416/95, 96 R, 97 R
See application file for complete search history.

(56) References Cited

U.S. PATENT DOCUMENTS

| | | | |
|---|---|---|---|
| 4,487,550 A | 12/1984 | Horvath et al. |
| 4,893,987 A | 1/1990 | Lee et al. |
| 5,564,902 A | 10/1996 | Tomita |
| 5,626,462 A | 5/1997 | Jackson et al. |
| 5,640,767 A | 6/1997 | Jackson et al. |
| 5,660,523 A | 8/1997 | Lee |
| 5,875,549 A | 3/1999 | McKinley |
| 6,059,530 A | 5/2000 | Lee |
| 6,086,328 A | 7/2000 | Lee |
| 6,164,914 A | 12/2000 | Correia et al. |
| 6,190,129 B1 | 2/2001 | Mayer et al. |
| 6,214,248 B1 | 4/2001 | Browning et al. |
| 6,231,307 B1 | 5/2001 | Correia |
| 6,234,755 B1 | 5/2001 | Bunker et al. |
| 6,321,449 B2 | 11/2001 | Zhao et al. |
| 6,368,060 B1 | 4/2002 | Fehrenbach et al. |
| 6,383,602 B1 | 5/2002 | Fric et al. |
| 6,405,435 B1 | 6/2002 | Konter et al. |
| 6,412,541 B2 | 7/2002 | Roesler et al. |

(Continued)

FOREIGN PATENT DOCUMENTS

EP     1387040 B1     4/2004

OTHER PUBLICATIONS

Hyams et al., "A Detailed Analysis of film Cooling Physics: Part III—Streamwise Injection With Shaped Holes," Journal of Turbomachinery, vol. 122, Issue 1, Jan. 2000, pp. 122-132.

(Continued)

*Primary Examiner* — Edward Look
*Assistant Examiner* — Juan G Flores
(74) *Attorney, Agent, or Firm* — Francis T. Coppa

(57) ABSTRACT

A method for providing a fluid cooling system within a high temperature component is described. At least one microchannel is formed in an external surface of the component; and one or more coolant passage holes are then formed, extending from at least one of the microchannels to an interior region of the component. A layer of a metallic structural coating is then applied over the external surface. At least one slot, or a set of relatively small passive cooling holes, are then formed through the metallic structural coating; extending into at least a portion of the microchannels. A second coating layer is then applied over the first layer. In some embodiments, a sacrificial material is deposited into the microchannels before the first coating layer is applied. Related articles are also described.

23 Claims, 5 Drawing Sheets

(56) References Cited

U.S. PATENT DOCUMENTS

| | | | |
|---|---|---|---|
| 6,427,327 B1 | 8/2002 | Bunker | |
| 6,461,107 B1 * | 10/2002 | Lee et al. | 416/96 R |
| 6,511,762 B1 | 1/2003 | Lee et al. | |
| 6,551,061 B2 | 4/2003 | Darolia et al. | |
| 6,582,194 B1 | 6/2003 | Birkner et al. | |
| 6,602,053 B2 | 8/2003 | Subramanian et al. | |
| 6,617,003 B1 | 9/2003 | Lee et al. | |
| 6,761,956 B2 | 7/2004 | Lee et al. | |
| 6,905,302 B2 * | 6/2005 | Lee et al. | 415/115 |
| 6,921,014 B2 | 7/2005 | Hasz et al. | |
| 7,014,923 B2 | 3/2006 | Schnelli et al. | |
| 7,094,475 B2 | 8/2006 | Schnell et al. | |
| 7,186,091 B2 | 3/2007 | Lee et al. | |
| 7,186,167 B2 | 3/2007 | Joslin | |
| 7,216,428 B2 | 5/2007 | Memmen et al. | |
| 7,302,990 B2 | 12/2007 | Bunker et al. | |
| 7,744,348 B2 | 6/2010 | Bezencon et al. | |
| 7,766,617 B1 | 8/2010 | Liang | |
| 7,775,768 B2 | 8/2010 | Devore et al. | |
| 8,147,196 B2 | 4/2012 | Campbell et al. | |
| 2002/0136824 A1 * | 9/2002 | Gupta et al. | 427/142 |
| 2002/0141868 A1 | 10/2002 | Lee et al. | |
| 2002/0141869 A1 | 10/2002 | Lee et al. | |
| 2002/0182074 A1 | 12/2002 | Bunker | |
| 2002/0197160 A1 | 12/2002 | Liang | |
| 2003/0118444 A1 | 6/2003 | Lee et al. | |
| 2004/0096328 A1 | 5/2004 | Soechting et al. | |
| 2004/0256504 A1 * | 12/2004 | Segrest et al. | 241/1 |
| 2006/0153680 A1 | 7/2006 | Liang | |
| 2008/0138529 A1 | 6/2008 | Weaver et al. | |
| 2010/0080688 A1 | 4/2010 | Bezencon et al. | |

OTHER PUBLICATIONS

Wei et al., "Curved Electrode and Electrochemical Machining Method and Assembly Employing the Same," U.S. Appl. No. 12/562,528, filed Sep. 18, 2009.

Zhang et al., Process and System for Forming Shaped Air Holes, U.S. Appl. No. 12/697,005, filed Jan. 29, 2010.

Lacy et al., "Hot Gas Path Component Cooling System," U.S. Appl. No. 12/765,372, filed Apr. 22, 2010.

Lacy et a., "Articles Which Include Chevron Film Cooling Holes, and Related Processes," U.S. Appl. No. 12/790,675, filed May 28, 2010.

Lambie et al., "An Overview on Micro-Meso Manufacturing Techniques for Micro-Heat Exchangers for Turbine Blade Cooling," International Journal Manufacturing Research, vol. 3, No. 1, 2008, pp. 3-26.

Bunker et al., "Components With Re-Entrant Shaped Cooling Channels and Methods of Manufacture," U.S. Appl. No. 12/943,624, filed Nov. 10, 2010.

Bunker et al., "Component and Methods of Fabricating and Coating a Component," U.S. Appl. No. 12/943,646, filed Nov. 10, 2010.

Bunker et al., "Method of Fabricating a Component Using a Fugitive Coating," U.S. Appl. No. 12/943,563, filed Nov. 10, 2010.

Bunker et al., "Components With Cooling Channels and Methods of Manufacture," U.S. Appl. No. 12/965,083, filed Dec. 10, 2010.

Bunker et al., "Method of Fabricating a Component Using a Two-Layer Structural Coating," U.S. Appl. No. 12/996,101, filed Dec. 13, 2010.

Bunker et al., "Turbine Components With Cooling Features and Methods of Manufacturing the Same," U.S. Appl. No. 12/953,177, filed Nov. 23, 2010.

Bunker, "Components With Cooling Channels and Methods of Manufacture," U.S. Appl. No. 13/026,595, filed Feb. 14, 2011.

Rebak et al., "Methods of Fabricating a Coated Component Using Multiple Types of Fillers," U.S. Appl. No. 13/083,701, filed Apr. 11, 2011.

Bunker et al., "Components With Cooling Channels Formed in Coating and Methods of Manufacture", U.S. Appl. No. 13/052,415, filed Mar. 21, 2011.

Rebak et al., "Component and Methods of Fabricating a Coated Component Using Multiple Types of Fillers," U.S. Appl. No. 13/095,129, filed Apr. 27, 2011.

Bunker, "Components With Cooling Channels and Methods of Manufacture", U.S. Appl. No. 13/168,144, filed Jun. 24, 2011.

Bunker et al., "Components With Cooling Channels and Methods of Manufacture", U.S. Appl. No. 13/210,697, filed Aug. 16, 2011.

Bunker, "Repair Methods for Cooled Components", U.S. Appl. No. 13/267,617, filed Oct. 6, 2011.

Bunker et al., Components With Laser Cladding and Methods of Manufacture, U.S. Appl. No. 13/278,816, filed Oct. 21, 2011.

Bunker, "Components With Microchannel Cooling", U.S. Appl. No. 13/326,540, filed Dec. 15, 2011.

* cited by examiner

COOLING CHANNEL SYSTEMS FOR HIGH-TEMPERATURE COMPONENTS COVERED BY COATINGS, AND RELATED PROCESSES

BACKGROUND OF THE INVENTION

In general, the invention relates to high temperature components that are covered by protective coatings, and are cooled by various air-flow systems. In some specific embodiments, the high temperature components are part of a gas turbine engine.

Turbine systems are widely utilized in fields such as power generation. A conventional gas turbine system utilized for power generation includes a compressor, a combustor, and a turbine. Typically, such a gas turbine system produces high temperature flows of gas through a flow path defined by the components of the turbine. Higher temperature flows generally are desirable, as they can lead to increased performance, efficiency, and power output of the gas turbine system. The high temperature flows are typically associated with or indicative of the types of combustion and flow conditions associated with a properly functioning gas turbine system. (In general, during gas turbine operation, for example, combustion gases may exceed about 1,600-1,700° C.; which is higher than the melting points of the engine components).

As might be expected, such high temperatures can cause excessive heating of the components within the flow path. Such heating may in turn cause one or more of these components to become damaged or to move outside of "specification", leading to a shortened operational life. Thus, because of the desirability of these high temperature flow conditions in a properly running system, the components that are subjected to high temperature flows must be cooled to allow the gas turbine system to operate with flows at increased temperatures.

A number of strategies may be employed for cooling components that are subjected to high temperature flows. These components are typically known as "hot gas path components". However, many of the cooling strategies employed result in comparatively low heat transfer rates and non-uniform component temperature profiles, which may be insufficient to achieve the desired cooling. Some of the cooling strategies may also decrease the overall turbine efficiency, because they divert an excessive amount of cooling air from the compressor of the engine.

For additional protection from the high-temperature gas flow, the exposed outer walls of the hot gas path components may be covered with a thermal barrier coating (TBC) system, which provides thermal insulation. TBC systems usually include at least one ceramic overcoat, and an underlying metallic bond coat. The benefits of thermal barrier coating systems are well-known.

In most of these exemplary gas turbine engine components, thin walls of high strength superalloy metals are typically used for enhanced durability, while minimizing the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and coatings. However, this cooling strategy can sometimes result in comparatively low heat transfer rates, and non-uniform component temperature profiles.

Micro-channel cooling has the potential to significantly reduce cooling requirements, by placing the cooling features as close as possible to the heat zone. In this manner, the temperature delta between the "hot side" and "cold side" of the main load-bearing substrate material of a component can be considerably reduced, for a given heat transfer rate. The formation and use of micro cooling channels is described in a pending U.S. application Ser. No. 12/953,177 (Ronald Bunker et al), filed on Nov. 23, 2010, and assigned to the assignee of the present Application. Additional details regarding these channels are provided below. In general, the channels are formed in an external surface of the hot gas path component, and are designed to allow the passage of a cooling fluid, such as compressed air, originating in the engine compressor. The flow of the cooling fluid may thereby cool adjacent or proximate regions of the component, through convective cooling. As an example, this type of cooling system can transfer heat from the component, or from one or more of the protective layers disposed on the component, to the cooling medium.

While the use of microchannels can provide the attributes presented above, some drawbacks remain in this type of cooling system scheme—especially in the case of gas turbine engine components. As an example, in some instances, the deposition of protective layers over the channels usually requires the use of a sacrificial material to fill the channels and underlying passage holes, prior to the deposition process. The necessary removal of the sacrificial material, e.g., by leaching, after the coatings have been applied, can be a slow process. There are a limited number of outlets for the sacrificial material, like the lower access sites for the passage holes; and these outlets are relatively small.

Moreover, in this type of cooling system, the TBC system is especially important, for protecting the substrate from adverse environmental and thermal effects. (The TBC also provides an aerodynamically smooth surface for coolant flow). However, the loss of portions of the TBC system—by damage or general coating failure—will leave the underlying micro-channel exposed on its outside surface, and thereby subject to direct exposure to the hot gas temperatures. This in turn can lead to serious damage of the component.

With these considerations in mind, new methods and structures for improving cooling capabilities in gas turbine engines and other high temperature components would be welcome in the art. The innovations should enhance the performance of the cooling stream, using microchannels and cooling passage holes, and without significantly decreasing engine efficiency. Moreover, there is considerable interest in improving manufacturing processes used in the formation of the cooling system and protective coating systems. Furthermore, cooling system structures that would provide additional coolant flow in the event of partial TBC failure would also be of considerable value. The film cooling structures should also not interfere with the strength and integrity of the turbine engine part.

BRIEF DESCRIPTION OF THE INVENTION

One embodiment of this invention is directed to a method for providing a fluid cooling system within a high temperature component. The method comprises the following steps:

a) forming at least one microchannel in an external surface of the component;

b) forming one or more coolant passage holes extending from at least one of the microchannels to an interior region of the component;

c) filling the microchannels and the coolant passage holes with a filler material;

d) applying a first layer of a metallic structural coating over the external surface, e) forming at least one slot or a set of relatively small passive cooling holes through the first layer of the metallic structural coating; wherein the slot or the passive cooling holes extend into at least a portion of one of the filled microchannels which are generally aligned below the slot or below the passive cooling holes;

f) removing the filler material; and g) applying at least a second coating layer over the first layer.

Another embodiment of this invention is also directed to a method for providing a fluid cooling system within a high temperature component. The method comprises the following steps:

A) forming at least one microchannel in an external surface of the component;

B) forming one or more coolant passage holes extending from at least one of the microchannels to an interior region of the component;

C) applying a first layer of a metallic structural coating over the external surface, D) forming at least one slot or a set of relatively small passive cooling holes through the first layer of the metallic structural coating; wherein the slot or the passive cooling holes extend into at least a portion of one of the microchannels which are generally aligned below the slot or below the passive cooling holes; and E) applying at least a second coating layer over the first layer.

Another embodiment of the invention is directed to a high-temperature component, comprising an exterior metal wall having a multitude of microchannels contained therein, wherein a multitude of coolant passage holes extend from a bottom surface of one or more of the microchannels, into an interior region of the component;

wherein the exterior wall is covered by at least one metallic coating; and wherein at least one slot or a multitude of passive cooling holes extend through a first layer of the metallic coating, into at least a portion of one or more of the underlying microchannels; and the slot or passive cooling holes are sealed at an exterior end by at least one layer of an additional coating material.

DETAILED DESCRIPTION OF THE INVENTION

Each embodiment presented below facilitates the explanation of certain aspects of the invention, and should not be interpreted as limiting the scope of the invention. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Figure 1:
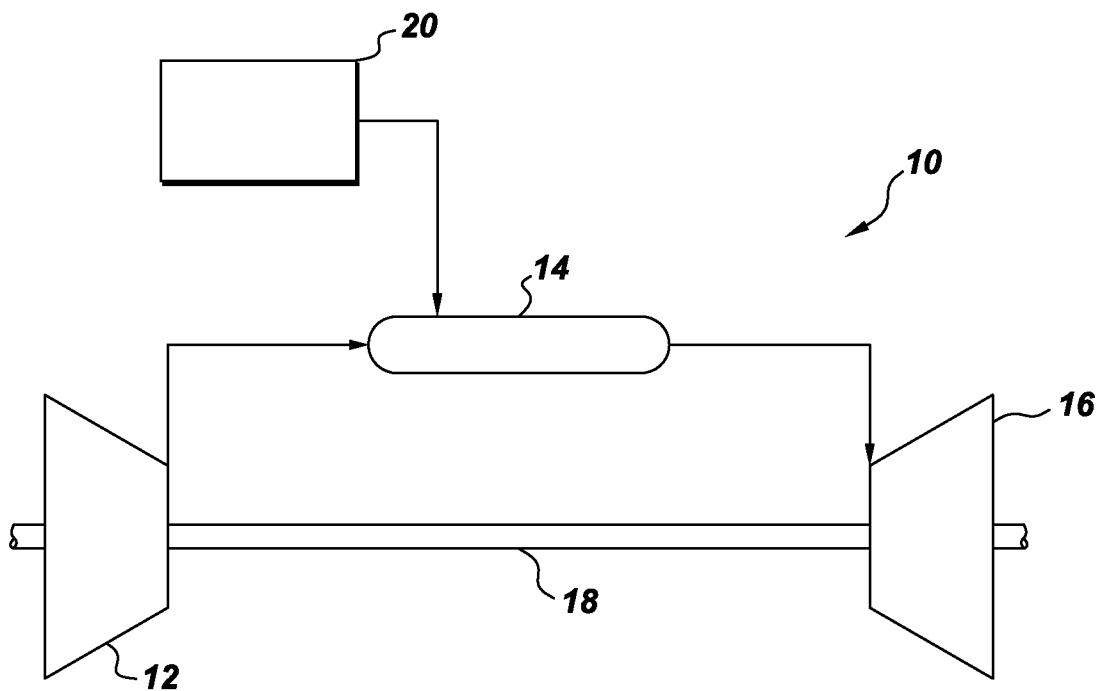
FIG. 1 is a schematic illustration of a gas turbine system.

FIG. 1 is a schematic view of a gas turbine system 10, in simplified form. The system 10 may include one or more compressors 12, combustors 14, turbines 16, and fuel nozzles 20. The compressor 12 and turbine 16 may be coupled by one or more shafts 18. The shaft 18 may be a single shaft or multiple shaft segments, coupled together.

The gas turbine system 10 may include a number of hot gas path components. A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and compressor exhaust components are all hot gas path components.

Figure 2:
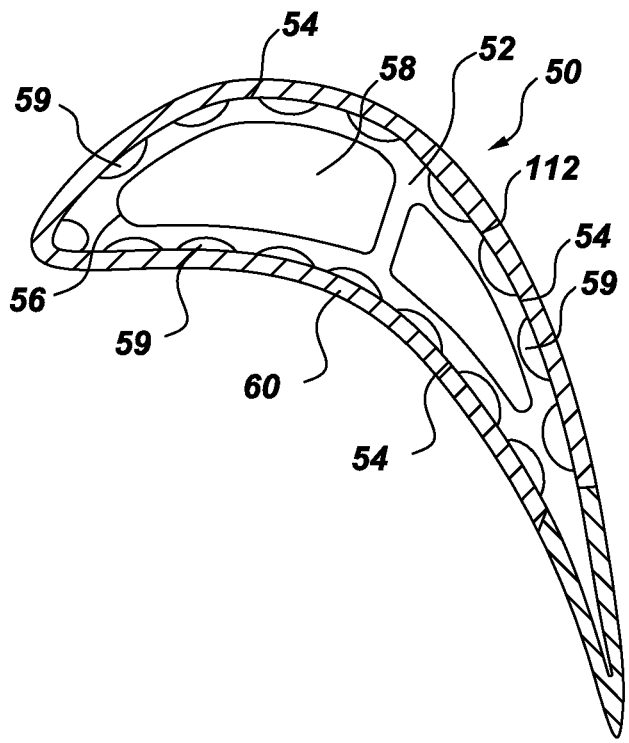
FIG. 2 is schematic cross-section of an exemplary airfoil configuration with a coating system applied over an outer surface of the airfoil

FIG. 2 is a top-view cross-section of an exemplary airfoil component 50, shown in simplified form (e.g, coolant feed-holes are not shown). Airfoil 50 includes a substrate 52 with an outer surface 54, and an inner surface 56. The inner surface defines at least one hollow, interior space 58. As further described below, the outer surface 54 includes one or more microchannels 59 extending into the surface region. As also detailed in the following description, a coating system 60 is disposed on the outer surface.

Figure 3:
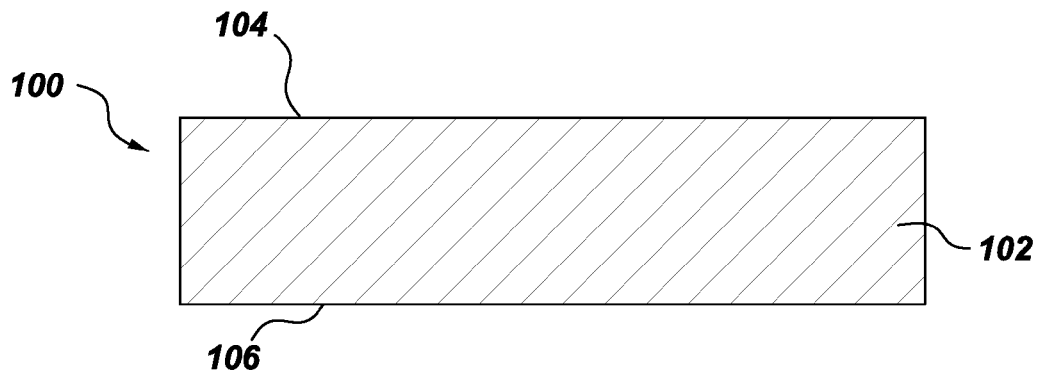
FIG. 3 is a cross-sectional view of a high-temperature substrate in which microchannels and passive cooling holes will be formed.

With reference to FIG. 3, a component or part 100 (e.g., a portion of the airfoil depicted in FIG. 2) can be formed by any conventional means, such as casting. The component includes a substrate 102, in which one surface 104 is the external or outward-facing surface of the component, and the opposing surface 106 is an internal or inward-facing surface. The part is typically cast prior to forming the microchannels described below.

Component 100 can be formed from various alloys used in high-temperature components. Many are described in U.S. Pat. No. 5,626,462, and its entire contents are incorporated herein by reference. Depending on the intended application for the component, it can be formed from Ni-base, Co-base or Fe-base superalloys, as an example. The component can also be formed from a NiAl intermetallic alloy, as these alloys are also known to possess a combination of superior properties, including high temperature strength and high temperature creep resistance. (These properties are advantageous for use in turbine engine applications used for aircraft and land-based power generation).

Figure 4:
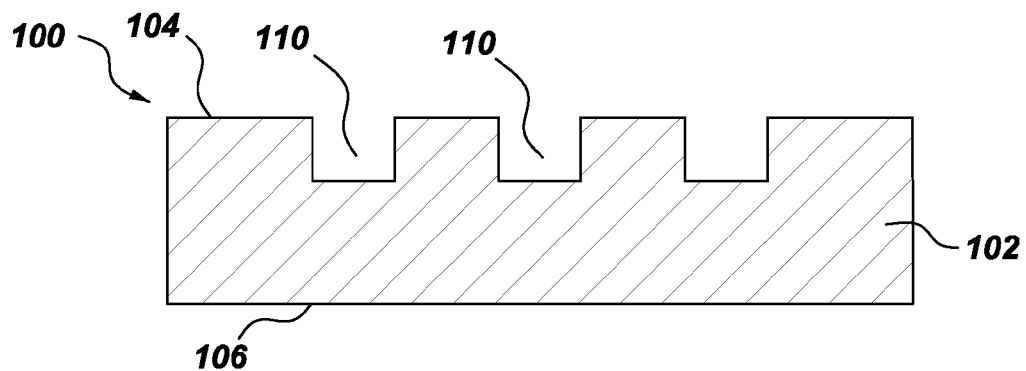
FIG. 4 is a cross-sectional view of the substrate of FIG. 3, in which microchannels have been formed.

With reference to FIG. 4, microchannels 110 (sometimes referred to herein as "micro-cooled channels"; or simply "channels") are formed in the external surface 104 of the part 100, according to these embodiments. As used in this description, the term "microchannel" is generally (though not always) meant to reference a channel or passageway that is at least about an order of magnitude smaller, e.g., width-wise, than other passageways or channels formed within or adjacent to a gas turbine or other high-temperature component. As further set forth below, a microchannel might have an average width of about 1 mm; while other types of passageways associated with the component may have an average width of greater than about 10 mm. Moreover, most of the microchannels are disposed on or within a surface of a part; while many of the types of larger channels are not formed on a surface, but are instead captured within the casting envelope of the part, or machined within the confines of the cast part.

In accordance with most embodiments, the channels 110, shown in FIG. 4, are designed or configured to allow the flow of a cooling fluid. The flow of the cooling fluid may thereby cool adjacent or proximate regions of the component 100 through convective cooling, as further described below. As also mentioned below, the microchannels can extend across a considerable length or span of the component, e.g., generally along the length of the hot gas path in a selected region of the component; though in some cases, they may extend across only a portion of the span.

The channels 110 may be formed or machined under the guidance or control of a programmed or otherwise automated process (such as a robotically-controlled process), to achieve the desired size, placement, and/or configuration of channels within the external surface 104. In some cases, the channels 110 may be formed in the external surface 104 through use of, for example, laser machining, abrasive liquid jet (e.g., abrasive micro water jet (AµWJ)), electro-chemical machining (ECM), plunge electro-chemical machining (plunge ECM), electro-discharge machining (EDM), milling electro-discharge machining (milling EDM), electron beam drilling, CNC machining, or any other process capable of providing channels with proper sizes and tolerances.

The channels may be formed in a wide variety of shapes and sizes. Pending application Ser. No. 12/953,177 (Bunker et al), mentioned above and incorporated herein by reference, describes many possible features for various types of microchannels. Other features, such as "re-entrant"-shaped channels, are described in Ser. No. 12/943,624 (Bunker et al; filed on Nov. 10, 2010), which is also incorporated herein by reference. (In that disclosure, the open portion of the channel is sometimes referred to as a "groove"). An illustration can be provided, with reference to FIG. 6 of Ser. No. 12/943,624, and with reference to FIG. 7 of the present disclosure, discussed below. In this alternative, the base 111 of the microchannel could be considerably larger than the top 113 of the microchannel, e.g., at least two times wider. This type of geometry can sometimes be helpful during deposition of the overlying metallic coating. For example, the re-entrant shape can help prevent the metallic coating from being deposited in the microchannel, in those cases where a filler/sacrificial material is not used in the microchannel, as discussed below.

In some embodiments, the channels 110 may have depths in a range from approximately 0.2 mm to approximately 2 mm, or from approximately 0.5 mm to approximately 1 mm. Furthermore, in certain embodiments the channels 110 may have widths in a range from approximately 0.2 mm to approximately 2 mm, or from approximately 0.5 mm to approximately 1 mm. Furthermore, the widths and/or depths may be substantially constant for a channel 110, or may vary (such as increasing, decreasing, tapering, and so forth) over the course of the channel 110.

Furthermore, with continuing reference to FIG. 4, the channels 110 may have cross-sections of any suitable geometric shape, such as, for example, a square, a rectangle, an oval, a triangle, or any other geometric shape that will facilitate the flow of a cooling medium through the channel 110. It should be understood that various channels 110 may have cross-sections with a certain geometric shape, while other channels 110 may have cross-sections with another geometric shape. In addition, in certain embodiments, the surface (i.e., the sidewalls and/or floor) of a channel 110 may be a substantially smooth surface, though in other embodiments, all or portions of the channel surface may include protrusions, recesses, surface texture, or other features, such that the surface of the channel is not smooth. For example, surface features that may be present on the surface of a channel 110 may include, but are not limited to, fin-shaped protrusions, cylindrical-shaped protrusions, or turbulators, or any combination thereof, as well as any other suitable geometric shape. It should be understood that the dimensions of any surface features that are present may be selected to optimize cooling provided by the respective channel 110.

The channels 110 may be generally straight channels, or may be generally curved, or serpentine channels. For example, all or part of the channels 110 may be provided as complex curves, or as part of a three-dimensional configuration with respect to the external surface 104 of the substrate 100. Indeed, the configuration of the channels 110 may be specific to the component being manufactured, such that certain portions of the component contain a higher density of cooling channels 110 than others. That is, the configuration of channels may be tailored to account for the expected heat profile of the component, when in use, as also described in application Ser. No. 12/953,177 (Bunker et al).

Figure 5:
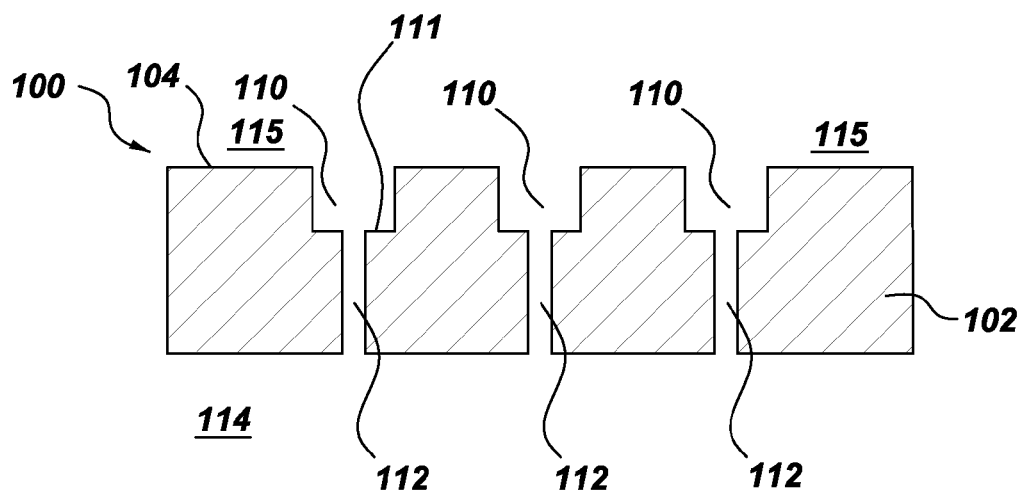
FIG. 5 is a cross-sectional view of the substrate of FIG. 4, in which passage holes have been formed through the substrate.

With reference to FIG. 5, one or more passage holes 112 may be popped or drilled, to connect some or all of the channels 110 to an interior region 114 of the component, such as a spar interior space. The passage holes are sometimes referred to herein as "coolant feed holes" or "coolant passage holes", which describes their typical function. As depicted, the holes 112 may extend generally through the substrate 102, and may fluidly connect the channels 110 to the interior space 114, as well as fluidly connecting some or all of the channels 110 to one another, via the interior space 114. For example, each channel 110 may be fluidly connected to at least one of the holes 112. The size of the passage holes may vary somewhat, but they usually have an average diameter of about 10 mils to about 30 mils (0.25 mm to 0.76 mm). Moreover, although the holes are depicted as being oriented perpendicularly within substrate 102, relative to surfaces 104 and 106, the angle of the hole can vary considerably, depending in part on desired cooling configurations. Many techniques can be used to form the passage holes, e.g., the processes noted above for the microchannels.

Once manufacture of the part 100 is complete, and the channels 110 are covered by a structural coating layer and/or other layers (as discussed below), the passage holes 112 may allow the flow of the cooling medium provided via the interior space 114, to the channels 110. For example, once a structural coating layer is in place over the respective channels 110, at least one cooling circuit may be defined within or provided on the surface of the part 100 by the respective fluidic connection of the interior space 114 to one or more channels 110, via respective passage holes 112. (As described below in reference to FIG. 13, the cooling circuit also includes an exit hole that constitutes part of an exit region for the microchannels. These exit holes are sometimes referred to as "film holes", penetrating all of the coatings to reach an exterior region 115 of the component 100.

With continuing reference to FIG. 5, the cooling medium may flow through a cooling circuit defined by these features, according to the overall pressure differential from the inlet to the exit of the cooling circuit. This pressure differential may cause a portion of the cooling medium contained within the cooling circuit to flow into and through the passage holes 112, and from the holes 112 into and through the channels 110 to one or more exit holes, thereby completing the flow circuit from the interior of the part to the exterior.

Figure 6:
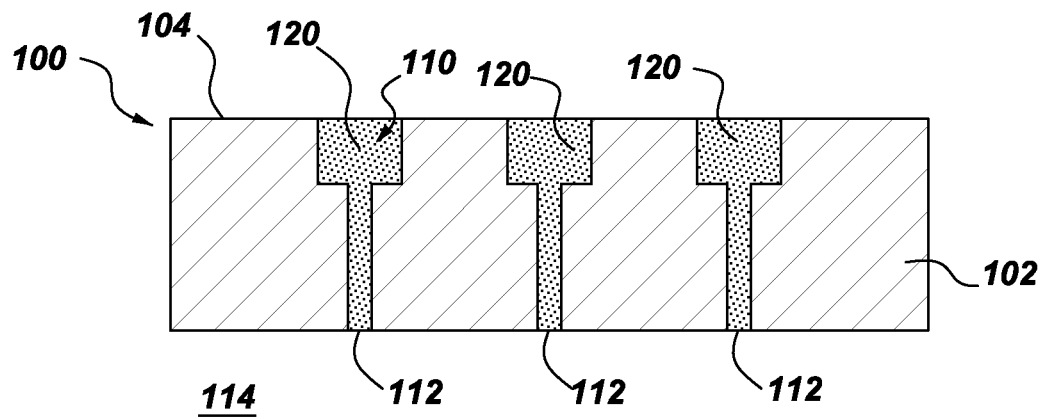
FIG. 6 is a cross-sectional view of the substrate of FIG. 5, in which a filler material has been applied.

With reference to FIG. 6, and according to this embodiment, the microchannels 110 and the passage holes 112 are then filled with one or more solid filler materials 120. These materials, which can be chemically removed during a subsequent step discussed below, are often referred to as "sacrificial materials". Their primary purpose is to prevent the intrusion of coating material into the microchannels and passage holes during the subsequent coating steps.

A variety of different sacrificial or filler materials can be used. Usually, they are ceramic materials (e.g., ceramic core materials) or metallic materials (e.g., metal alloys or metal inks). However, in some instances (depending on the temperatures employed for subsequent coating depositions), UV-curable resins (e.g., polymeric materials), or graphite, may be used as the sacrificial material. The material should be one having a consistency which allows insertion into the depth of the passage holes.

Suitable metallic materials that may be used to form the solid metal filler may include, but are not limited to, copper, aluminum, molybdenum, tungsten, nickel, monel, and nichrome. In some specific embodiments, the filler material 120 is a solid wire filler formed from an elemental or alloy metallic material. As an example, the filler material can be a deformable material, such as an annealed metal wire, which when mechanically pressed into the channel 110, is deformed to conform to the shape of the channel 110. Pending Application application Ser. No. 12/953,177, mentioned above, describes this technique. (It should be appreciated that the term "wire" as used herein denotes a solid continuous piece of material that conforms to, or can be mechanically deformed to conform to, the cross-sectional shape of the respective channels 110).

With continuing reference to FIG. 6, in some embodiments, the metal or metal alloy material may be provided as a powder that is pressed into the channel 110, and conforms to the channel, so as to substantially fill the channels 110 and passage hole 112. Any portion of the solid metal filler that protrudes out of the channel 110 (i.e., overfill) may be polished or machined off, prior to application of coatings, as discussed below. The external surface 104 of the substrate 102 may then be cleaned and prepared for coating. Exemplary treatment techniques include machining, grit blasting, washing, polishing, or various combinations thereof.

Figure 7:
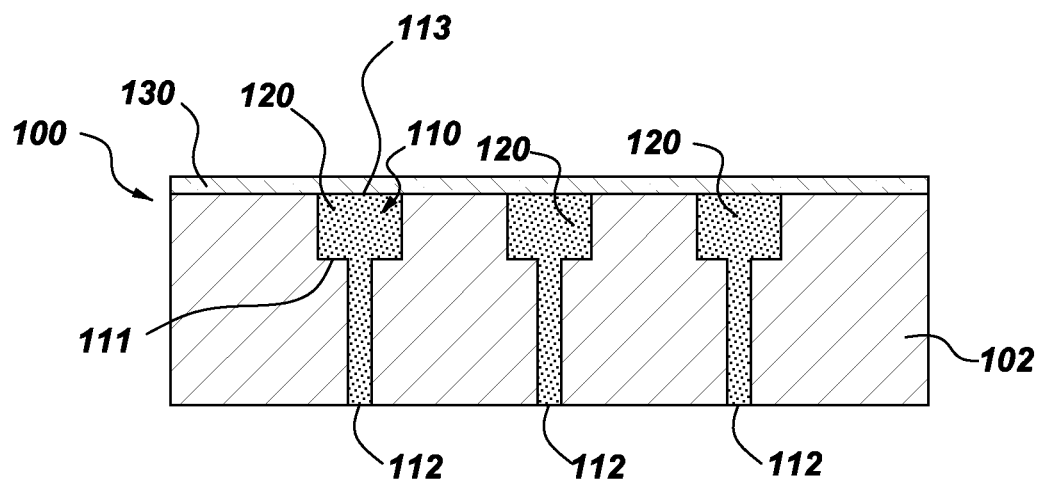
FIG. 7 is a cross-sectional view of the substrate of FIG. 6, in which a first coating layer has been applied.

A metallic structural coating 130 is then applied over substrate surface 104, as depicted in FIG. 7. A number of metallic coatings can be employed, if they can be deposited to form a substantially non-porous structure. (The metallic coatings are also highly adherent to the substrate, as compared to a ceramic coating). Non-limiting examples of such metallic coatings include metal aluminides, such as nickel aluminide (NiAl) or platinum aluminide (PtAl). Other examples include compositions of the formula MCrAl(X), where "M" is an element selected from the group consisting of Fe, Co and Ni and combinations thereof; and "X" is yttrium, tantalum, silicon, hafnium, titanium, zirconium, boron, carbon, or combinations thereof. Other suitable metallic coatings (including other types of "MCrAl(X)" compositions) are also described in the referenced application Ser. No. 12/953,177; in U.S. Pat. No. 6,511,762 (Lee et al), which is incorporated herein by reference; and in the previously mentioned U.S. Pat. No. 5,626,462. Moreover, in some cases, the structural coating 130 may be formed of a superalloy material (Ni-, Co-, or Fe-based), e.g., a material similar or identical to that forming substrate 102.

The structural first coating 130 may be applied by a variety of techniques. Non-limiting examples include physical vapor deposition (PVD) processes such as electron beam (EB), ion-plasma deposition, or sputtering. Thermal spray processes may also be used, such as air plasma spray (APS), low pressure plasma spray (LPPS), high velocity oxyfuel (HVOF) spray, or high velocity air fuel spraying (HVAF). The choice of a particular technique will depend on various factors, such as the specific type of coating being applied; the desired thickness; the size of the channel; the size and number of parts to be coated, and the type of sacrificial material used. In some cases, ion plasma deposition is particularly suitable. One such system is referred to as cathodic arc ion plasma deposition. It is described in U.S. Published Patent Application No. 2008/0138529, Weaver et al, published Jun. 12, 2008, which is incorporated herein by reference.

The thickness of the metallic structural coating will depend on various factors. They include: the specific type of coating; the type of coatings applied thereover; and the projected stress-strain characteristics of the coating at its interface with the substrate. Usually, the coating is at least about 5 mils (0.13 mm) in thickness. In most embodiments, the thickness is in the range of about 0.1 mm to about 1 mm.

Figure 8:
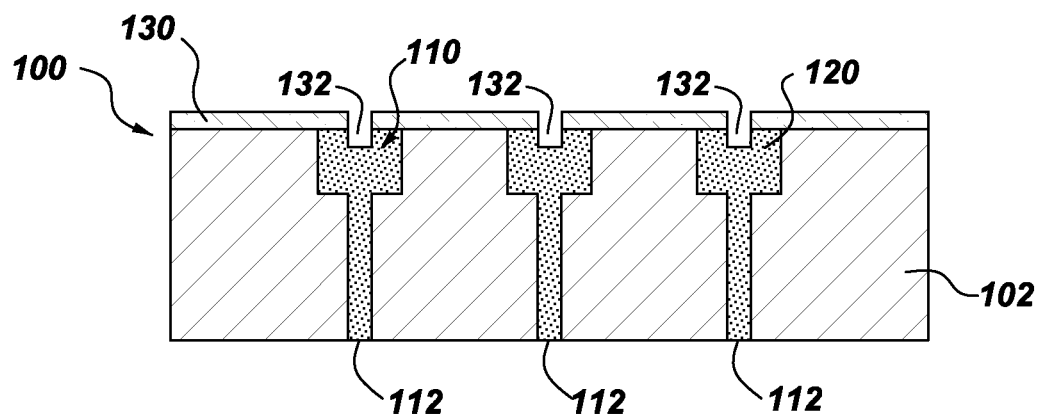
FIG. 8 is a cross-sectional view of the substrate of FIG. 7, in which passive cooling holes have been formed.

A set of relatively small passive cooling holes is then formed through the metallic structural coating, along the length of one or more of the microchannels. As shown in FIG. 8, passive holes 132 extend through metallic coating 130, and into the sacrificial material 120 which fills microchannels 110. The passive cooling holes can be formed by a variety of techniques, most of which were described above, with reference to passage holes 112. Examples of the techniques include EDM, laser, and abrasive water jet systems.

Passive holes 132 are usually (though not always) arranged in a uniform pattern, equally spaced apart from each other. Although the passive holes are depicted as being perpendicular, relative to surface 104, they may be formed or "pitched" at various angles away from the perpendicular orientation. Moreover, the passive holes need not be aligned with the center of a micro-channel (e.g., in the width direction in the figure), and can be (even individually) positioned off-center of the bottom of the channel.

Figure 9:
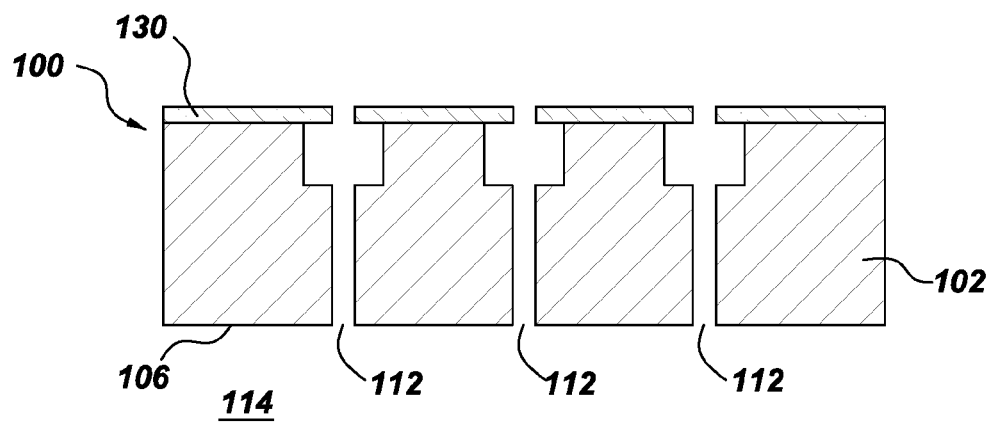
FIG. 9 is a cross-sectional view of the substrate of FIG. 8, in which the filler material has been removed.

As mentioned above, the passive cooling holes 132 are relatively small, as compared to the size of coolant passage holes 112, as shown in FIG. 9. In most embodiments, the passive cooling holes have an average diameter that is less than about 50% of the average diameter of the coolant passage holes. Typically, the passive cooling holes have an average diameter in the range of about 5 mils (0.13 mm) to about 20 mils (0.51 mm); and in some some cases, about 5 mils to about 15 mils (0.38 mm).

After the formation of the passive cooling holes 132, the sacrificial/filler material is removed from the microchannels 110 and from the passage holes 112. A number of conventional techniques can be used to remove the sacrificial material. Non-limiting examples include leaching, dissolving, melting, oxidizing, etching, and combinations thereof. The choice of a particular technique will depend on various factors, such as the particular composition of the sacrificial material; the internal shape of coolant passageways; and the composition of the substrate and coating. Frequently, removal of the filler material is carried out by immersion of the component in an appropriate treatment bath. As described below, the presence of the passive cooling holes (e.g., see FIG. 9) can advantageously accelerate removal of the filler.

Figure 10:
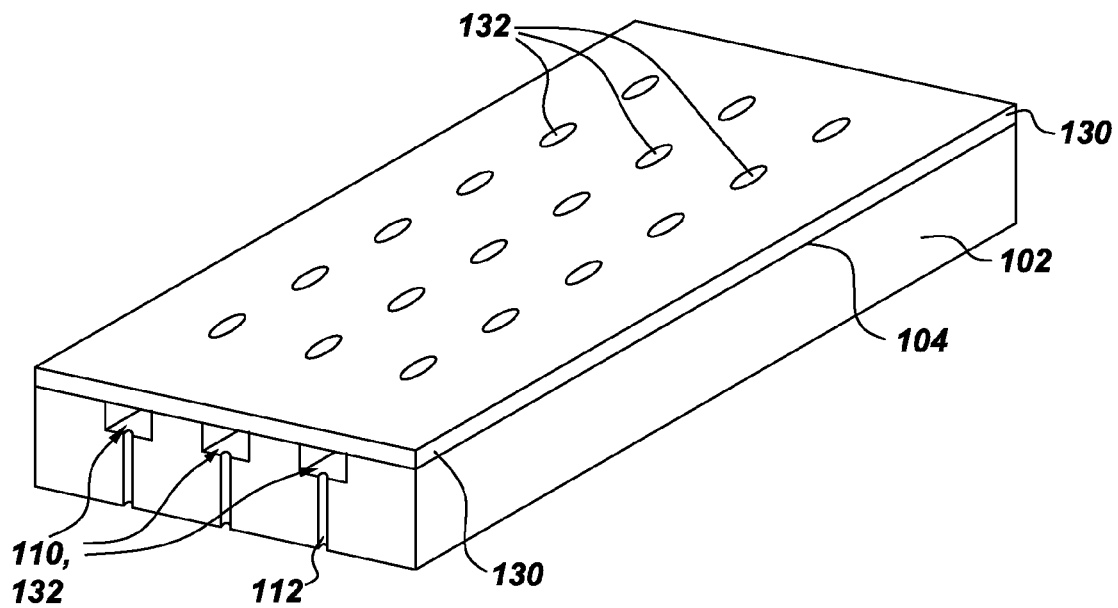
FIG. 10 is a perspective view of the substrate of FIG. 9.

FIG. 10 is a perspective view of the general structure of FIG. 9, showing substrate 102, exterior surface 104, microchannels 110, and an ordered array of passage holes (e.g., coolant feed holes) 112. The passive cooling holes 132 are also depicted, extending through metallic layer 130, into different sections of microchannels 110. As mentioned previously, passive holes 132 need not be disposed in an ordered array, and need not be disposed along a uniform axis through the length of any micro-channel 110.

Figure 11:
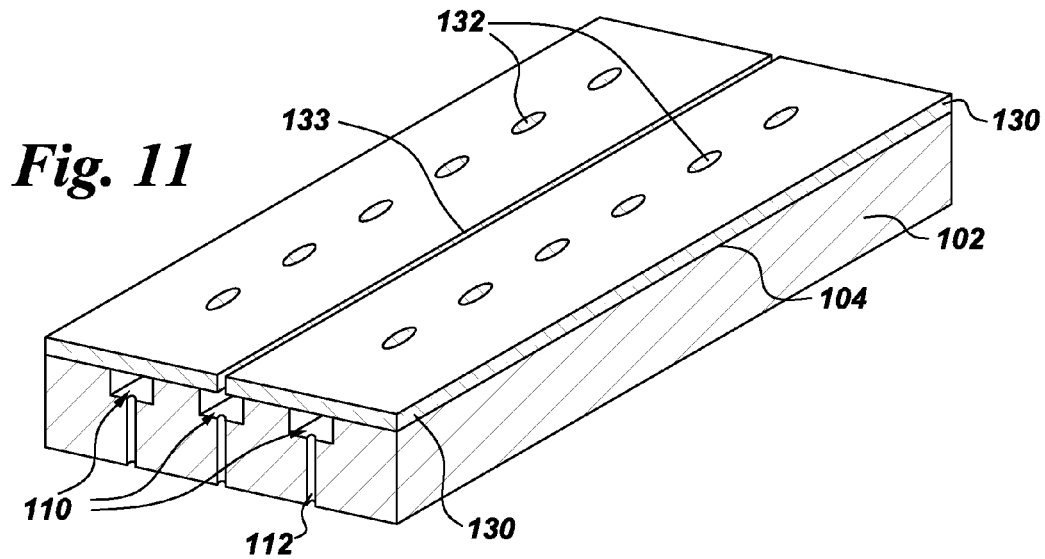
FIG. 11 is a perspective view of a substrate similar to FIG. 9, according to an alternative embodiment.

FIG. 11 is a perspective view of an alternative embodiment, in which at least one row of passive cooling holes in FIG. 10 is replaced by a slot 133. (All other elements in the figure can be considered to be the same as for FIG. 10). Although one slot is shown here (and with an arbitrary width), in some embodiments, a slot is present in place of each row of passive cooling holes. It may be desirable to form these slots in some cases, rather than holes, to more evenly distribute the eventual pressure-load arising from layers being applied over the slot. The slots can be formed by many of the techniques described previously, e.g., abrasive liquid jet, EDM, and the like. Moreover, instead of a single slot along any particular dimension on the surface, a series of discrete, smaller slots could be employed.

The size of the slots is somewhat variable, although in many instances, the width of the slot (i.e., the direction horizontal to that of the slot span) is about equivalent to the diameter of passive holes employed in the other embodiment. Moreover, the slots can also be thought to have an average width that is less than about 50% of the average diameter of the coolant feed-holes (not shown in this figure). Furthermore, the slots need not be positioned directly over a central, longitudinal axis of the microchannels, but can be off-center. The slots can also include slanted side-walls. Most of these variations will be determined by the particular cooling configuration desired for the component.

Figure 12:
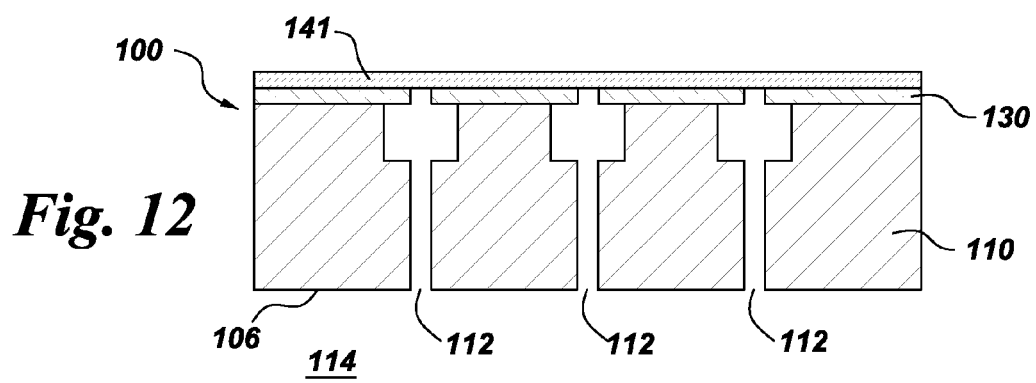
FIG. 12 is a cross-sectional view of the substrate of FIG. 9, in which a second layer of structural coating material has been applied over the first layer.

With continuing reference to the formation of the passive cooling holes last described with reference to FIG. 9, a second, metallic structural coating layer is then applied over first coating 130 in this embodiment, as depicted in FIG. 12. The second coating covers the upper outlet 142 of each of the passive cooling holes 132, making the holes "passive", as described below. As in the case of the first coating, the second coating for this embodiment is also substantially non-porous, and can be formed of any of the metallic materials described above; e.g, superalloys, metal aluminides, MCrAl(X) materials, and the like. As one non-limiting illustration, the second coating could be formed of an MCrAl(X) material, when the first coating is formed of a superalloy material. The coating can also be applied by any of the techniques described previously.

The thickness for the second metallic structural coating will depend on various factors, like some of those listed previously for the first layer. The second layer should be thick enough to "bridge over" the passive cooling holes 132; and to adequately support a subsequently-applied ceramic material. Usually, the second coating is at least about 0.1 mm in thickness. In most embodiments, the thickness is in the range of about 0.1 mm to about 0.5 mm). (In some embodiments, at least one more metallic coating, i.e., a third layer, may be applied).

In some embodiments, a component, as described herein, can be adequately protected with two or more of the metallic coatings covering selected outer surfaces. However, in many embodiments, the high temperature component also includes at least one overlying ceramic coating, as mentioned previously. In these instances, the underlying metallic coating (or coating system) often functions in part as a bond layer, as also noted previously.

Thus, in many embodiments, at least one ceramic coating is applied over the second metallic structural layer (or over the top of the upper metallic layer, if more than two layers are disposed on the substrate). As described above, the ceramic coating is usually in the form of a thermal barrier coating (TBC), and can comprise a variety of ceramic oxides, such as zirconia ($ZrO_2$); yttria ($Y_2O_3$); magnesia (MgO), and combinations thereof. In a preferred embodiment, the TBC comprises yttria-stabilized zirconia (YSZ). Such a composition forms a strong bond with the underlying metallic layer; and provides a relatively high degree of thermal protection to the substrate. (U.S. Pat. No. 6,511,762 provides a description of some aspects of TBC coating systems).

The TBC can be applied by a number of techniques. Choice of a particular technique will depend on various factors, such as the coating composition; its desired thickness; the composition of the underlying metallic layer(s); the region on which the coating is being applied; and the shape of the component. Non-limiting examples of suitable coating techniques include PVD, and plasma spray techniques. In some instances, it is desirable for the TBC to have a degree of porosity. As an example, a porous YSZ structure can be formed, using PVD or plasma spray techniques.

The thickness of the TBC will depend in part on some of the factors set out previously, in regard to the metallic coatings. The thermal environment in which the component will operate is a key factor, as is the end use of the part; and the number of TBC layers being applied. Usually (though not always), TBC's employed for land-based turbine engines will have an overall thickness in the range of about 3 mils to about 45 mils (0.08 mm to 1.14 mm). Usually (though not always), TBC's employed for aviation applications, e.g., jet engines, will have an overall thickness in the range of about 1 mil to about 20 mils (0.03 mm to 0.51 mm).

In other embodiments, the TBC can be applied directly over the first metallic structural layer, i.e., over layer 130 in FIG. 9. As an example, the TBC may sometimes provide enough coating strength to be disposed over a single metallic layer when the passive cooling holes are quite small in size, e.g., less than about 4 mils (0.1 mm) in diameter. As in the other embodiments, multiple TBC layers may be applied; e.g., as in the referenced Lee et al patent, U.S. Pat. No. 6,511,762.

Figure 13:
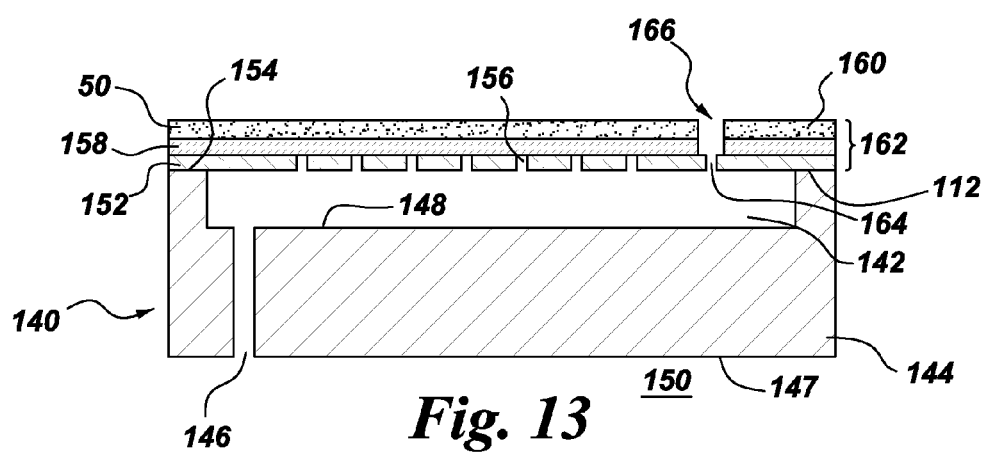
FIG. 13 is a cross-sectional view of a portion of another high-temperature component, according to embodiments of this invention.

FIG. 13 is a cross-sectional view of a portion of another high-temperature component, e.g., a turbine airfoil 140; according to some of the embodiments set forth herein. In this figure, one microchannel 142 is featured, formed within substrate 144. One coolant passage hole 146 is illustrated, communicating with channel 142 (i.e., opening in the channel's bottom surface 148); and providing a conduit to an internal region 150 of the airfoil.

A first structural coating layer 152, formed of a metallic material, is shown disposed over an external surface 154 of substrate 144. A series of passive cooling holes 156 are shown, extending through structural layer 152. In this embodiment, the structural layer 152 is covered by a second, metallic structural layer 158. A ceramic-based thermal barrier coating 160 is disposed over layer 158. (Coatings 152, 158, and 160 can be collectively referred to as a "protective coating system" 162. (As noted above, in alternative embodiments, layer 158 could in some cases be a ceramic TBC, with or without a second TBC 160).

Passage hole 164 opens into an exit region or "trench" 166, which defines an exit region for the microchannel 142. A number of trenches can be formed through the coating system 162, depending on the coolant flow scheme for the airfoil. The trenches can be formed by any of the techniques described previously.

In the context of a turbine airfoil serving as the high-temperature component, the passive cooling holes described above provide at least several important attributes to cooling systems which rely on microchannels and thermal barrier coating systems. First, they provide additional outlets for the removal of filler materials (e.g., by the leaching technique mentioned earlier), after the initial coating is applied to the component. Secondly, they provide additional passages/routes for coolant air moving to the exterior of the component, in the event that the overlying protective coatings fail, i.e., if some portion of the coating system 162 (FIG. 13) is damaged or becomes separated from the substrate 144. In other words, coolant fluid flowing from a source in the interior region 150 of the component is directed into passage holes 146, at bottom surface 147. A portion of the coolant can flow upwardly (according to the orientation of the figure), into microchannel 142, and into passive cooling holes 156. This airflow provides additional, beneficial film cooling to sections of the airfoil which would lack the protection of the damaged or missing TBC. In this manner, the small cooling holes are effectively transformed from coating-sealed "passive holes", to uncovered, "active holes".

In another embodiment of this invention, the sacrificial/filler materials are not necessary, although the passive cooling holes are still incorporated into the overall structure. Thus, in this embodiment, the microchannels are formed in an external surface, as described previously, followed by the formation of one or more coolant passage holes. The metallic structural coating can then be applied over the external surface, as also described previously. At least one slot or a set of relatively small passive cooling holes are then formed through the metallic structural coating, extending into at least a portion of the microchannels, as also described above. A second coating layer (or multiple layers) can then be formed over the first layer. The second coating layer can be ceramic or metallic, as also described herein; or can be a metallic layer, followed by one or more ceramic layers.

It should be apparent from the above description that another embodiment of this invention is directed to a high-temperature component, comprising an exterior metal wall having a multitude of microchannels contained therein, wherein a series of passage holes (e.g., coolant feed holes) each extend from a bottom surface of one or more of the microchannels, into an interior region of the component. The exterior wall is covered by at least one metallic coating, and in some instances, by at least one, overlying thermal barrier coating (TBC). In this embodiment, one or more slots, or a multitude of relatively small passive cooling holes, extend through a first layer of the metallic coating, into at least a portion of one or more of the microchannels. The slot(s) or the passive cooling holes are sealed at the upper end (i.e., closest to the outside of the exterior wall) by at least one second coating layer, e.g., at least one metallic layer or at least one TBC layer, or some combination thereof.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

What is claimed:

1. A method for providing a fluid cooling system within a high temperature component, comprising the following steps:
    a) forming at least one microchannel in an external surface of the component;
    b) forming one or more coolant passage holes extending from at least one of the microchannels to an interior region of the component;
    c) filling the microchannels and the coolant passage holes with a filler material;
    d) applying a first layer of a metallic structural coating over the external surface;
    e) forming at least one slot or a set of relatively small passive cooling holes through the first layer of the metallic structural coating; wherein the slot or the passive cooling holes extend into at least a portion of one of the filled microchannels which are generally aligned below the slot or below the passive cooling holes;
    f) removing the filler material; and
    g) applying at least a second coating layer over the first layer.

2. The method of claim 1, wherein each microchannel is formed in the external surface by a technique selected from the group consisting of laser machining, abrasive liquid jet cutting, electric discharge machining (EDM), milling electro-discharge machining (milling EDM), electron beam drilling, plunge electrochemical machining, and CNC machining.

3. The method of claim 1, wherein each coolant passage hole is formed by a technique selected from the group consisting of plunge electro-chemical machining (plunge ECM), laser machining, laser drilling, abrasive liquid jet cutting, electric discharge machining (EDM), and electron beam drilling.

4. The method of claim 1, wherein the filler material is selected from the group consisting of ceramic materials, metals, metal alloys, metal inks; curable polymeric materials, graphite, and combinations thereof.

5. The method of claim 1, wherein the coolant passage holes have an average diameter of about 10 mils to about 30 mils (0.25 mm to 0.76 mm).

6. The method of claim 1, wherein the average diameter of the passive cooling holes is less than about 50% of the average diameter of the coolant passage holes.

7. The method of claim 1, wherein the passive cooling holes have an average diameter of about 5 mils to about 20 mils (0.13 mm to 0.51 mm).

8. The method of claim 1, wherein the slot has an average width that is less than about 50% of the average diameter of the coolant passage holes.

9. The method of claim 1, wherein the first layer of the metallic structural coating is formed of a superalloy material; a metal aluminide, or a material having the formula MCrAl(X), wherein M is iron, cobalt, nickel, or combinations thereof; and X is yttrium, tantalum, silicon, hafnium, titanium, zirconium, boron, carbon, or combinations thereof.

10. The method of claim 1, wherein the overall thickness of the metallic structural layer is in the range of about 0.1 mm to about 1.0 mm.

11. The method of claim 1, wherein the second coating layer is a metallic structural coating that comprises a superalloy material; a metal aluminide, or a material having the formula MCrAl(X); wherein M is iron, cobalt, nickel, or combinations thereof; and X is yttrium, tantalum, silicon, hafnium, titanium, zirconium, boron, carbon, or combinations thereof.

12. The method of claim 1, wherein the second coating layer comprises a ceramic material.

13. The method of claim 12, wherein the ceramic material is selected from the group consisting of zirconia ($ZrO_2$); yttria ($Y_2O_3$); magnesia (MgO); and combinations thereof.

14. A method for providing a fluid cooling system within a high temperature component, comprising the following steps:
A) forming at least one microchannel in an external surface of the component;
B) forming one or more coolant passage holes extending from at least one of the microchannels to an interior region of the component;
C) applying a first layer of a metallic structural coating over the external surface,
D) forming at least one slot or a set of relatively small passive cooling holes through the first layer of the metallic structural coating; wherein the slot or the passive cooling holes extend into at least a portion of one of the microchannels that are generally aligned below the slot or below the passive cooling holes; and
E) applying at least a second coating layer over the first layer.

15. The method of claim 14, wherein the second coating layer is selected from the group consisting of metallic structural materials and ceramic materials.

16. The method of claim 14, wherein the second coating layer is a metallic structural material; and at least one ceramic coating layer is then applied over the second coating layer.

17. A high-temperature component, comprising an exterior metal wall having a multitude of microchannels contained therein, wherein a multitude of coolant passage holes extend from a bottom surface of one or more of the microchannels, into an interior region of the component;
wherein the exterior wall is covered by at least one metallic coating; and
wherein at least one slot, or a multitude of passive cooling holes, extend through a first layer of the metallic coating, into at least a portion of one or more of the underlying microchannels; and the slot or the passive cooling holes are sealed at an exterior end by at least a second coating layer.

18. The high-temperature component of claim 17, wherein the second coating layer is selected from the group consisting of metallic structural materials and ceramic materials.

19. The high-temperature component of claim 18;
wherein the metallic structural material comprises a superalloy material; a metal aluminide, or a material having the formula MCrAl(X), wherein M is iron, cobalt, nickel, or combinations thereof; and X is yttrium, tantalum, silicon, hafnium, titanium, zirconium, boron, carbon, or combinations thereof; and
wherein the ceramic material is selected from the group consisting of zirconia ($ZrO_2$); yttria ($Y_2O_3$); magnesia (MgO); and combinations thereof.

20. The high-temperature component of claim 17, wherein the second coating layer comprises a metallic structural material; and is covered by at least one ceramic coating layer.

21. The high-temperature component of claim 17, wherein the slot or the passive cooling holes have an average diameter that is less than about 50% of the average diameter of the coolant passage holes.

22. The high-temperature component of claim 17, in the form of a turbine engine component.

23. The turbine engine component of claim 22, in the form of an airfoil.

* * * * *